US010999376B2

(12) United States Patent
Jain

(10) Patent No.: US 10,999,376 B2
(45) Date of Patent: May 4, 2021

(54) SIMULATING PARALLEL MOCK REST SERVICES WITH SINGLE SERVER

(71) Applicant: Walmart Apollo, LLC, Bentonville, AR (US)

(72) Inventor: Himanshu Jain, San Diego, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 239 days.

(21) Appl. No.: 15/879,385

(22) Filed: Jan. 24, 2018

(65) Prior Publication Data

US 2019/0230164 A1 Jul. 25, 2019

(51) Int. Cl.
*H04L 29/08* (2006.01)

(52) U.S. Cl.
CPC .......... *H04L 67/141* (2013.01); *H04L 67/146* (2013.01)

(58) Field of Classification Search
CPC ... H04L 65/1069; H04L 67/141; H04L 67/14; G06F 11/14; G06F 11/08
USPC ........................................................ 709/227
See application file for complete search history.

(56) References Cited

U.S. PATENT DOCUMENTS

| | | | |
|---|---|---|---|
| 8,417,569 B2* | 4/2013 | Gross ................. | G06Q 30/0242 705/14.41 |
| 8,418,000 B1* | 4/2013 | Salame ................. | G06F 11/263 714/38.1 |
| 9,087,001 B1* | 7/2015 | Christensen ........ | G06F 11/1484 |
| 10,089,219 B1* | 10/2018 | Bates ...................... | G06F 9/451 |
| 10,360,126 B2* | 7/2019 | Covell ................ | G06F 11/3466 |
| 2005/0256858 A1* | 11/2005 | McArdle ............... | G06F 16/242 |
| 2013/0080834 A1* | 3/2013 | Sakai ................... | G06F 11/3696 714/32 |
| 2013/0167116 A1* | 6/2013 | Mahmud ............. | G06F 11/3672 717/120 |
| 2013/0311830 A1* | 11/2013 | Wei ..................... | G06F 11/0748 714/32 |
| 2014/0026122 A1* | 1/2014 | Markande ........... | G06F 11/3688 717/124 |
| 2015/0118756 A1* | 4/2015 | Pollack .............. | G01N 35/0092 436/43 |
| 2015/0120678 A1* | 4/2015 | Kong .................. | G06F 16/2282 707/690 |
| 2015/0363301 A1* | 12/2015 | Chen ................... | G06F 3/04847 717/125 |
| 2016/0364308 A1* | 12/2016 | Shanbhogue ....... | G06F 11/2635 |
| 2017/0068608 A1* | 3/2017 | Covell ................ | G06F 11/3466 |
| 2017/0277891 A1* | 9/2017 | Keppler ................ | G06F 21/552 |

(Continued)

*Primary Examiner* — Mahran Y Abu Roumi
(74) *Attorney, Agent, or Firm* — Duane Morris LLP; Manita Rawat

(57) ABSTRACT

Systems and methods for providing parallel mock rest services are disclosed. A system includes a computing device configured to execute a mock resource server including at least a first session associated with a first set of endpoint values. The mock resource server is configured to receive a session request and provide a set of endpoint values. The first session is associated with a first session identifier. A first resource call including the first session identifier is received and a session request for a first session is generated by the computing device. The resource call is generated by a first application server during execution of a first test case. The first set of endpoint values is transmitted to the first application server. The first set of endpoint values is provided by the first session in response to the session request.

18 Claims, 13 Drawing Sheets

(56) References Cited

U.S. PATENT DOCUMENTS

2018/0006925 A1\* 1/2018 Bohra ................. H04L 41/0645
2018/0107589 A1\* 4/2018 Sefferman ................. G06F 8/61
2018/0349254 A1\* 12/2018 Hui ..................... G06F 11/3692

\* cited by examiner

SIMULATING PARALLEL MOCK REST SERVICES WITH SINGLE SERVER

TECHNICAL FIELD

This application relates generally to server testing environments and, more particularly, relates to dependent resources provided in a server testing environment.

BACKGROUND

Application testing is an integral part of updating computer and digital environments. Prior to implementing updates or new applications (or environment changes), inter testing environments are used to test execution of applications under a variety of circumstances. Testing environments often rely on internal and/or external production resources to provide input during testing. For a successful test, dependent resources relied on by the tested application must be responsive (i.e., running and accessible). For example, when testing an application that relies on input from a first resource and a second resource, the testing environment must ensure that the second service and the third service are each available prior to executing the test of the application, or the test will fail.

Dependent resources may undergo downtime for various reasons, such as updating, testing, unexpected errors, etc. When a dependent resource experiences downtime, testing of applications (or other resources) that rely on the dependent resource must be delayed. In environments that include multiple interrelated resources managed by multiple machines, teams, networks, companies, etc., coordinating testing times to ensure all dependent resources are available is logistically difficult. In addition, the use of live or production resources can tax system resources or cause delays in other test and/or live application execution.

SUMMARY

In various embodiments, a system is disclosed. The system includes a computing device configured to execute a mock resource server including at least a first session associated with a first set of endpoint values. The mock resource server is configured to receive a session request and provide a set of endpoint values. The first session is associated with a first session identifier. A first resource call including the first session identifier is received and a session request for a first session is generated by the computing device. The resource call is generated by a first application server during execution of a first test case. The first set of endpoint values is transmitted to the first application server. The first set of endpoint values is provided by the first session in response to the session request.

In various embodiments, a non-transitory computer readable medium having instructions stored thereon which, when executed by a processor cause a device to perform operations. The instructions cause the device to execute a mock resource server including at least a first session associated with a first set of endpoint values. The mock resource server is configured to receive a session request and provide a set of endpoint values. The first session is associated with a first session identifier. A first resource call including the first session identifier is received and a session request for the first session is generated by the device. The resource call is generated by a first application server during execution of a first test case. The first set of endpoint values is transmitted to the first application server. The first set of endpoint values are provided by the first session in response to the session request.

In various embodiments, a method is disclosed. The method includes a step of executing a mock resource server including at least a first session associated with a first set of endpoint values The mock resource server is configured to receive a session request and provide a set of endpoint values. The first session is associated with a first session identifier. A first resource call including the first session identifier is received and a session request for the first session is generated by the device. The resource call is generated by a first application server during execution of a first test case. The first set of endpoint values is transmitted to the first application server. The first set of endpoint values are provided by the first session in response to the session request.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, systems and methods of providing mock services in a testing environment are disclosed. The testing environment includes a testing server configured to implement one or more test application servers and a mock server configured to implement one or more mock resource servers. Each mock resource server includes one or more sessions associated with a set of endpoint values. Each test application server is configured to transmit a resource call to the mock resource server and receive a predetermined set of endpoint values from the mock resource server. In some embodiments, resource call includes a session identifier identifying one of the sessions implemented by a mock resource server. The mock server is configured to receive the resource call and generate a session-specific request for the mock resource server. In some embodiments, the mock server is configured to automatically update one or more of the sets of endpoint values based on recorded responses from one or more corresponding live resource servers.

Figure 1:
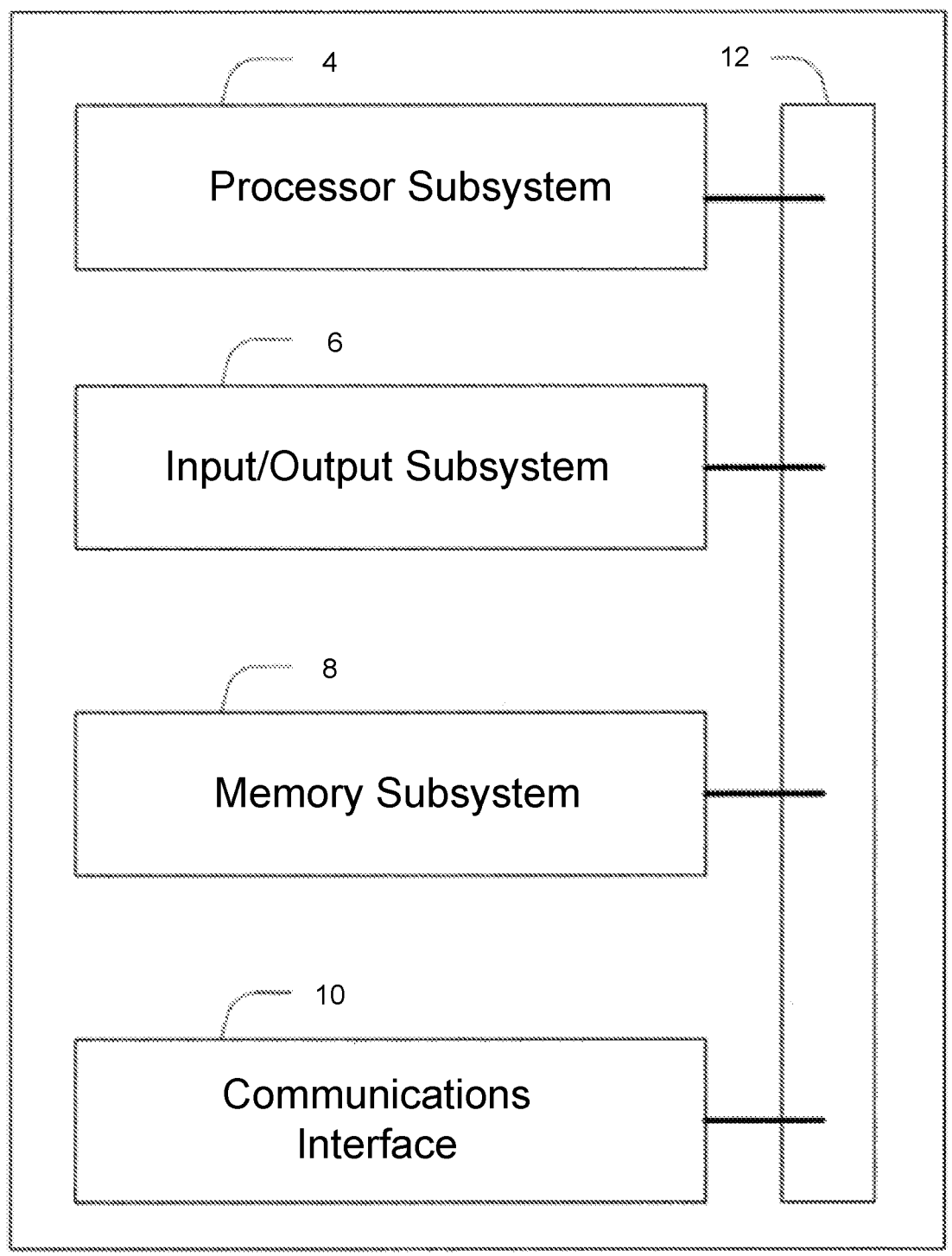
FIG. 1 illustrates a computer system configured to implement one or more processes, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 4 components may be combined or omitted such as, for example, not including a input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and smart measurement points, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
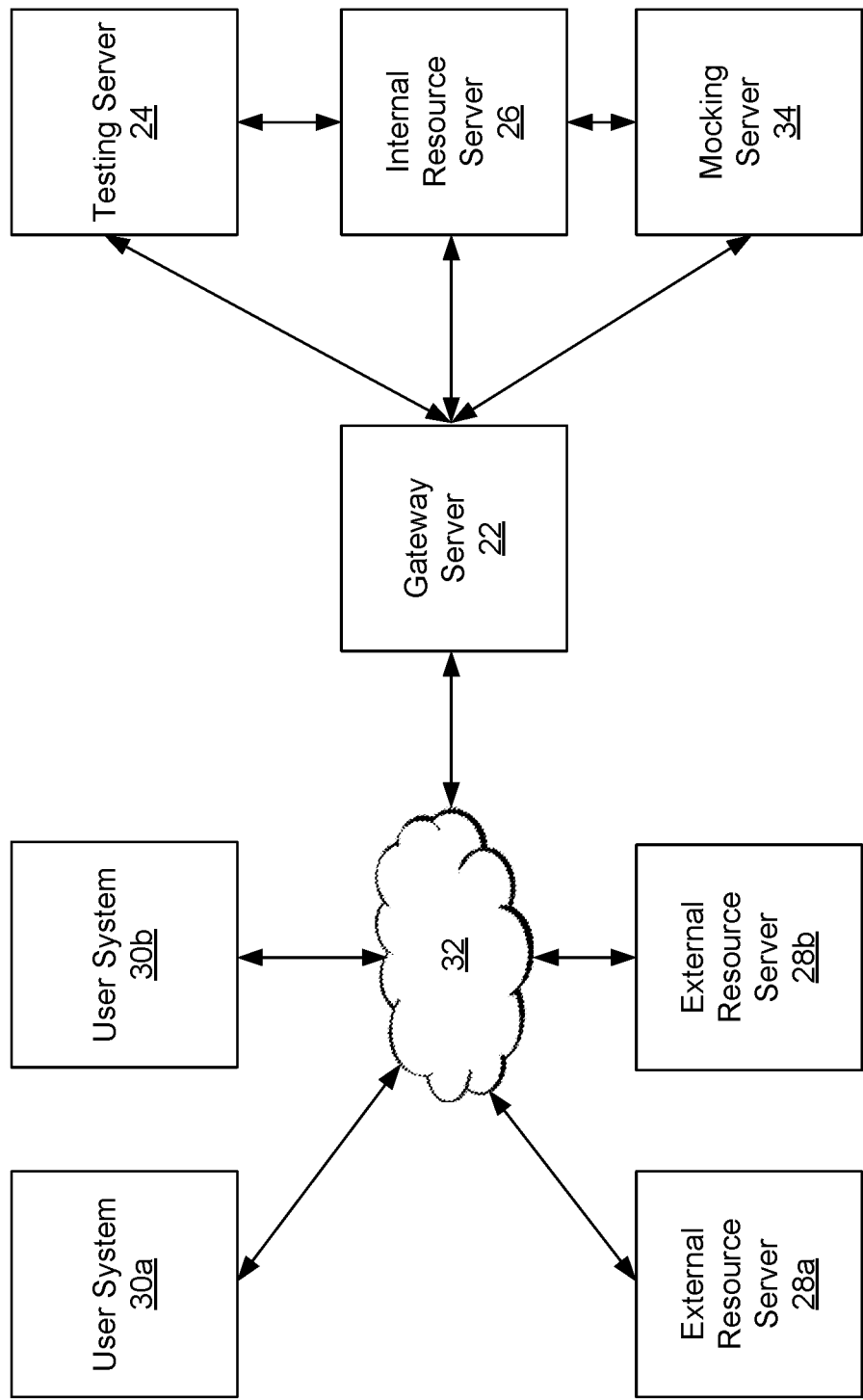
FIG. 2 illustrates a testing environment including a plurality of systems configured to test one or more network applications or system, in accordance with some embodiments.

FIG. 2 illustrates a testing environment 20 including a testing server 24, in accordance with some embodiments. Testing environment 20 may include one or more servers, such as a gateway server 22, testing server 24, one or more internal resource servers 26, one or more external resource servers 28a, 28b, a mock server 34, etc. and one or more user devices 30a, 30b (or terminals). Each of the one or more servers and/or the user devices are in signal communication, for example, through a network 32 or through direct connections. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. Each of the gateway server 22, testing server 24, internal resource server 26, mock server 34, one or more external resource servers 28a, 28b, and user systems 30a, 30b may include a computing system as described above in conjunction with FIG. 1, and similar description is not repeated herein.

In some embodiments, one or more components of the testing environment 20, such as the gateway server 22, testing server 24, internal resource server 26, and/or the mock server 34 may be associated with a single entity and/or location. For example, the testing server 24 can be physically and/or logically located in proximity to the internal resource server 26, maintained by a single entity, and/or otherwise associated together. One or more other components, such as the external resource servers 28a, 28b may be physically and/or logically remote from the testing server 24. For example, in some embodiments, the external resource servers 28a, 28b may be maintained by the same entity as the testing server 24 but are physically remote from the testing server 24. As another example, in some embodiments, the external resource servers 28a, 28b are maintained by an entity other than the entity associated with the testing server 24.

In some embodiments, each user system 30a, 30b can be accessed by a user to enable the user to communicate with the testing server 24. For example, each user system 30a, 30b is capable of connecting to, for example, the network 32 and communicating with testing server 24. In some embodiments, user devices 30a, 30b are configured to access information from and/or perform operations on the testing server 24. For example, in some embodiments, a user system 30a, 30b can access the testing server 24 to implement one or more test application servers, environments, interfaces, and/or other elements, as discussed in more detail herein.

As explained in more detail below, the testing environment 20 includes a mock server 34 is configured to mock (or mimic) one or more dependent resources required during a test implemented by the testing server 24. For example, the testing server 24 may receive a request to execute a test application server requiring an endpoint response from one or more dependent resources. If one or more of the required dependent resources are unavailable, the mock server 34 provides a predetermined (or mock) endpoint value that mimics a response from for the unavailable dependent resource. As used herein, the term dependent resource is used to refer to any system, device, storage repository, service, or other element that may be relied on by an application server during a test and/or live execution.

Figure 3:
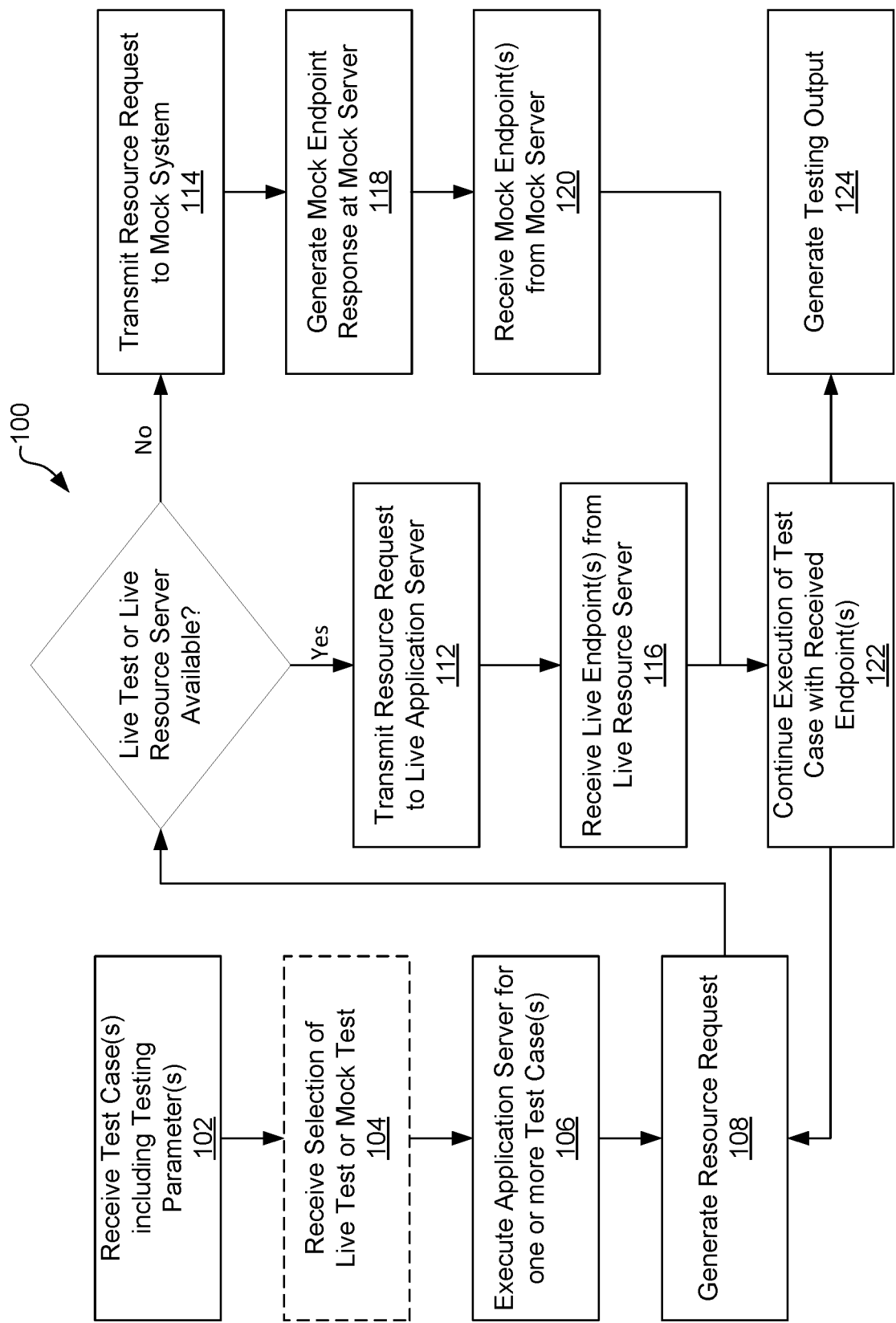
FIG. 3 is a flowchart illustrating a method of providing mock or live testing services, in accordance with some embodiments.
Figure 4:
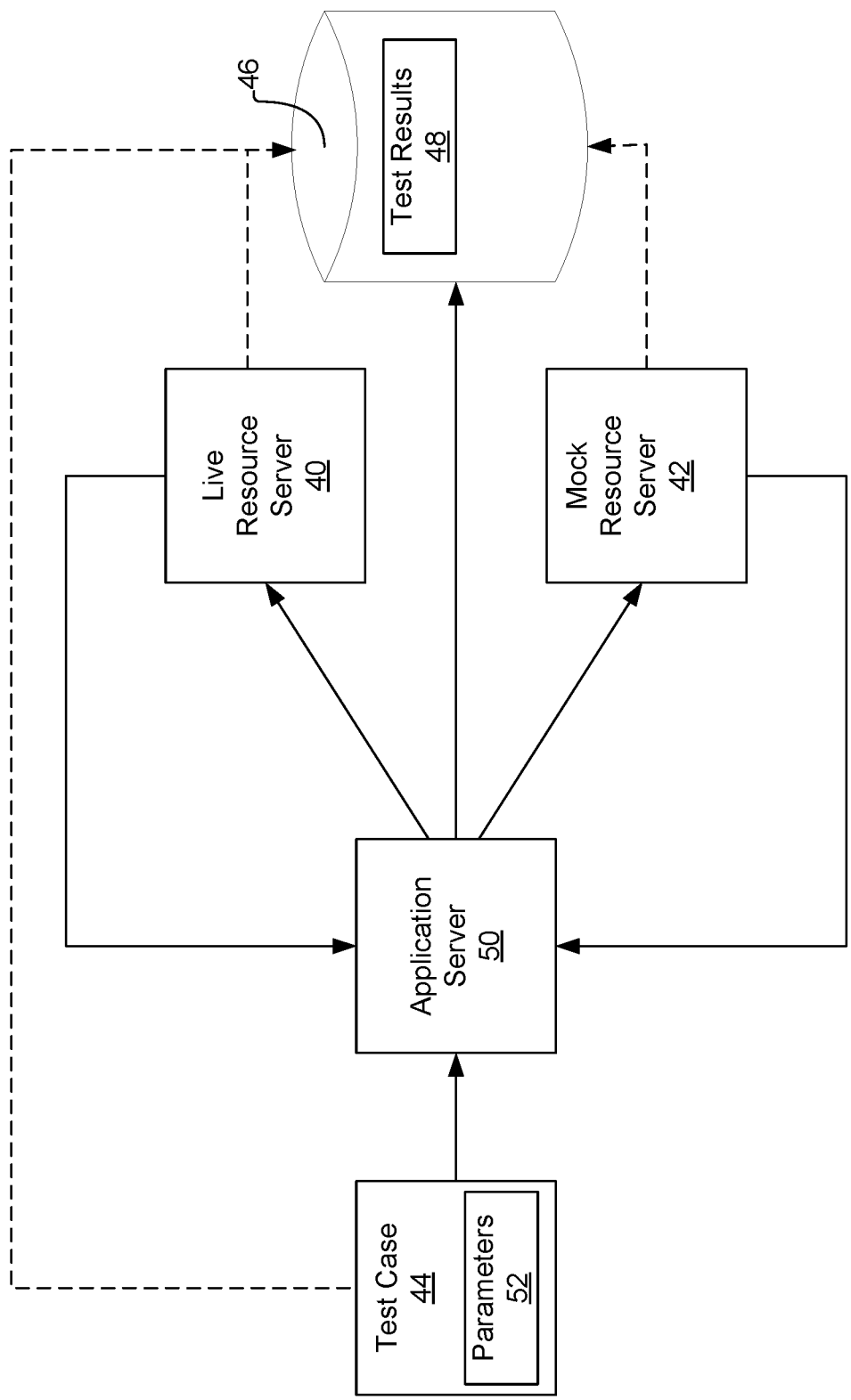
FIG. 4 illustrates various elements of a testing environment during execution of the method of FIG. 3, in accordance with some embodiments.

FIG. 3 is a flowchart illustrating a method 100 of providing mock or live testing services, in accordance with some embodiments. FIG. 4 illustrates various elements of a testing environment 20 during execution of the method 100, in accordance with some embodiments. At step 102, one or more test cases 44 containing one or more test parameters 52 are provided to a testing server 24. The testing server 24 can include any suitable system, such as an application server configured to provide one or more applications in a network environment, a web server configured to provide one or more webpages in a network environment, a testing server configured to execute one or more test environments, and/or any other suitable system. The test cases 44 may be provided by a user system 30a, 30b in signal communication with the testing server 24, loaded from a memory repository (such as a database), and/or otherwise provided to the testing server 24.

At optional step 104, the testing server 24 receives a selection of one of a live test or a mock test. For example, in some embodiments, a user system 30a, 30b provides a test case 44 including a parameter 52 indicating that the test cases 44 is to be tested using live resources (e.g., dependent resources provided by a resource server to a production version of the application being tested) and/or executed using mock resources (e.g., endpoint responses provided by the mock server 34 to mimic responses from live dependent resources). In other embodiments, step 104 is skipped and the testing server 24 automatically determines whether to use live or mock resources in one or more other steps, as discussed in greater detail below.

At step 106, the testing server 24 implements a test application server 50 for the test case 44, as shown in FIG. 4. For example, in some embodiments, the test case 44 corresponds to one or more specific tasks to be performed by an application server, such as a network application server. The testing server 24 is configured to implement and monitor at least one instance of the application server 50 using the parameters included in the test case 44. As another example, in some embodiments, the test case 44 corresponds to one or more state inputs to advance an application server. A test application server 50 is implemented including the initial state provided in the parameters 52 and advanced through the state changes identified in the test case 44.

At step 108, the test application server generates a dependent resource call to obtain one or more endpoint values from a dependent resource. The dependent resource can be included on the testing server 24, a server on a shared LAN (such as the internal resource server 26), and/or a server located on a separate LAN (such as an external resource server 28a, 28b). In some embodiments, one or more systems, such as the testing server 24, the gateway server 22, the mock server 34, etc. are configured to intercept the dependent resource call. For example, in some embodiments, the testing server 24 recognizes that the application server 50 has executed a dependent resource call and prevents the dependent resource call from being transmitted until one or more additional steps are executed, as discussed below.

At step 110, the testing server 24 (or other server intercepting the dependent resource call) determines whether the call should be forwarded to a live dependent resource or routed to the mock server 34 for implementation of a mock resource server. If a live test was selected at optional step 104, the method 100 transitions to step 112 and the testing server 24 forwards the dependent resource call to a live resource server including a live resource, such as the internal resource server 24 and/or an external resource server 28a, 28b. If a mock test was selected at option step 104, method 100 transitions to step 114 and the testing server 24 forwards the dependent resource call to the mock server 34.

In embodiments omitting step 104 (i.e., in which a live test or mock test is not preselected), the testing server 24 is configured to automatically determine the availability and/or use of a live resource server. For example, in some embodiments, the testing server 24 maintains a list or other reference of available dependent resources and compares the dependent resource call to the available live resources. If the dependent resource call is for an available live resource, the test may be executed as a live test. As another example, in some embodiments, the testing server 24 may poll live resource servers associated with the dependent resource call to determine if the live resource server is available. If the live resource server is available, the method 100 transitions to step 112 and the testing server 24 provides the dependent resource call to a live resource server. If the testing server 24 determines that the live server and/or live resource is not available (for example, non-response from live server), the method 100 transitions to step 114 and the testing server 24 provides the dependent resource call to the mock server 34. In other embodiments, if a live test is not indicated by the parameters 52 of the test case 44, the testing environment 20 defaults to a mock test and forwards the dependent resource call to the mock server 34.

If the testing server 24 determines that a live test is appropriate, at step 112, the testing server 24 provides the dependent resource call to a live application server 40. The live application server 40 includes a live resource server 40. The live resource server 40 may be implemented by any suitable system, such as an internal resource server 26, an external resource server 28a, 28b, and/or any other suitable server. The live resource server 40 receives the dependent resource call, executes the requested dependent resource, and transmits an endpoint response to the testing server 24. For example, in some embodiments, the live resource server 40 provides an endpoint response containing one or more values generated by the dependent resource. At step 116, the testing server 24 receives the response from the live resource server 40. The term endpoint response is used herein to refer to any suitable response provided by a dependent resource, such as a variable value, pointer, file path, etc.

If the testing server 24 determines that a mock test is required, at step 114, the testing server 24 provides the dependent resource call to a mock resource server 42. The mock resource server 42 is implemented by any suitable server or system, such as, for example, the mock server 34. The mock resource server 42 is configured to provide one or more predetermined endpoint responses based on the test application server 50 that generated the dependent resource call. For example, in some embodiments, the mock resource server 42 is configured to provide one or more user-defined endpoint values in response to the dependent resource call. A user my define a predetermined endpoint value as a parameter 52 included in the test case 44. As another example, in some embodiments, the mock resource server 42 is configured to provide system-defined endpoint values in response to the dependent resource call. For example, the mock resource server 42 may be configured to load endpoint values from one or more databases associated with and/or in signal communication with the mock server 34. At step 118, the testing server 24 receives the response from the mock resource server 42.

After receiving a response (either a live endpoint response or a mock endpoint response), at step 120, the test application server 50 continues execution and generates one or more test results 48. In some embodiments, one or more additional dependent resource calls are generated by the test application server 50. The method 100 can transition back to step 108 and proceed through steps 108-118 as discussed above for each subsequent dependent resource call. After completing the test case (including all required dependent resource calls), the test application server 50 generates an output at step 124. The output may include one or more selected test results 48 that are stored in a database 46 for further review and/or analysis. In some embodiments, the test case 44 and/or the responses of the live and/or mock resource servers 40, 42 may also be stored in the database 46 for review and/or analysis.

Figure 5:
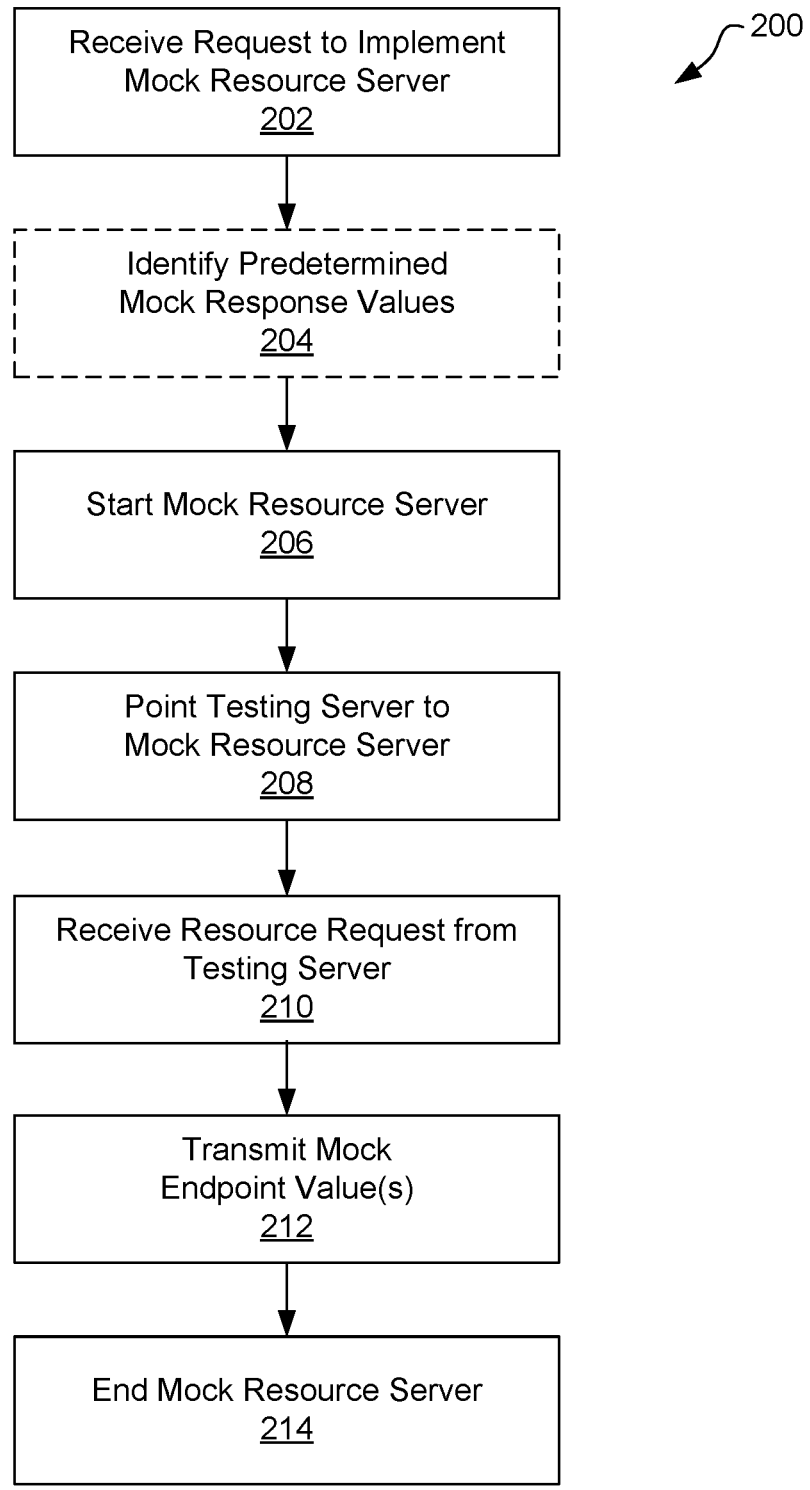
FIG. 5 illustrates a method of generating a mock application result for use by a testing server, in accordance with some embodiments.

FIG. 5 illustrates a method 200 of generating a mock application result for use by a testing server, for example, during execution of method 100 as discussed above, in accordance with some embodiments. At step 202, the mock server 34 receives a request to implement a mock resource server, such as mock resource server 42 illustrated in FIG. 4. The mock server 34 can receive a request to implement a mock resource server prior to and/or during execution of a test application server 50 requiring a mock resource server 42.

For example, in some embodiments, a user may designate a mock test for one or more test cases prior to execution of the test application server 50. The testing server 24 generates a request to the mock server 34 to implement a mock resource server 42 for each resource server required during execution of the received test case 44. The mock server 34 may implement the mock resource server(s) 42 prior to execution of the test cases by the testing server 24.

As another example, in some embodiments, the testing server 24 may determine that one or more live resource servers 40 are unavailable during execution of a live test. The testing server 24 generates a request to the mock server 34 to implement a mock resource server 42 to mimic the unavailable live resource server 40. The mock server 34 implements the requested mock resource server 42 during execution of the test case by the testing server 24.

At optional step 204, the mock server 34 identifies one or more predetermined endpoint values associated with the received request. For example, in some embodiments, the testing server 24 (or other system such as the user system 30a, 30b) may provide one or more predetermined endpoint values that are desired and/or required to be provided by a mock resource server 42 during execution of a test application server 50. The predetermined endpoint values can include any suitable values, such as data, pointers, paths, and/or any other suitable endpoints. In some embodiments, the predetermined response values may be obtained from a storage container, such as a database, in signal communication with the mock server 34 and one or more additional systems. The predetermined endpoint values may be manually provided by a user and/or automatically collected by a server (such as the mock server 34) during an interaction with a live resource server (as described in greater detail below).

At step 206, the mock server 34 implements a mock resource server 42. The mock resource server 42 is configured to appear as a live resource server 40 from the perspective of the test application server 50. In some embodiments, the mock resource server 42 is configured to generate responses and/or transmit data similar or identical to the endpoint values provided by a live resource server 40. In some embodiments, the mock resource server 42 may include a plurality of sessions each configured to provide a set of predetermined endpoint values, as discussed in greater detail below.

At step 208, a pointer or address of the mock resource server 42 is provided to the testing server 24 for use in one or more test application servers 50. The mock resource server 42 may be identified as a mock resource server 42 and/or may be presented to the test application server 50 as a live resource server 40.

At step 210, a dependent resource call is received from the test application server 50 at the mock resource server 42. For each dependent resource call received by the mock resource server 42, one or more of the predetermined endpoints is provided to the testing server 24 at step 212. For example, in some embodiments, the mock resource server 42 is configured to mimic a resource having two endpoint values when successfully executed. The mock resource server 42 is configured to provide a predetermined value for each of the two endpoints when a dependent resource call is received at the mock resource server 42. In some embodiments, the predetermined endpoints are provided by the mock server 34 and/or a database 46 in signal communication with the mock server 34. In some embodiments, the mock resource server 42 includes a plurality of sessions each configured to provide a set of endpoint responses, as discussed in greater detail below.

At step 214, the mock resource server 42 is terminated by the mock server 34. The mock resource server 42 may be terminated after providing one or more predetermined responses and/or may be terminated in response to a notification from the testing server 24 that the test application server 50 completed execution of the test case 44.

Figure 6:
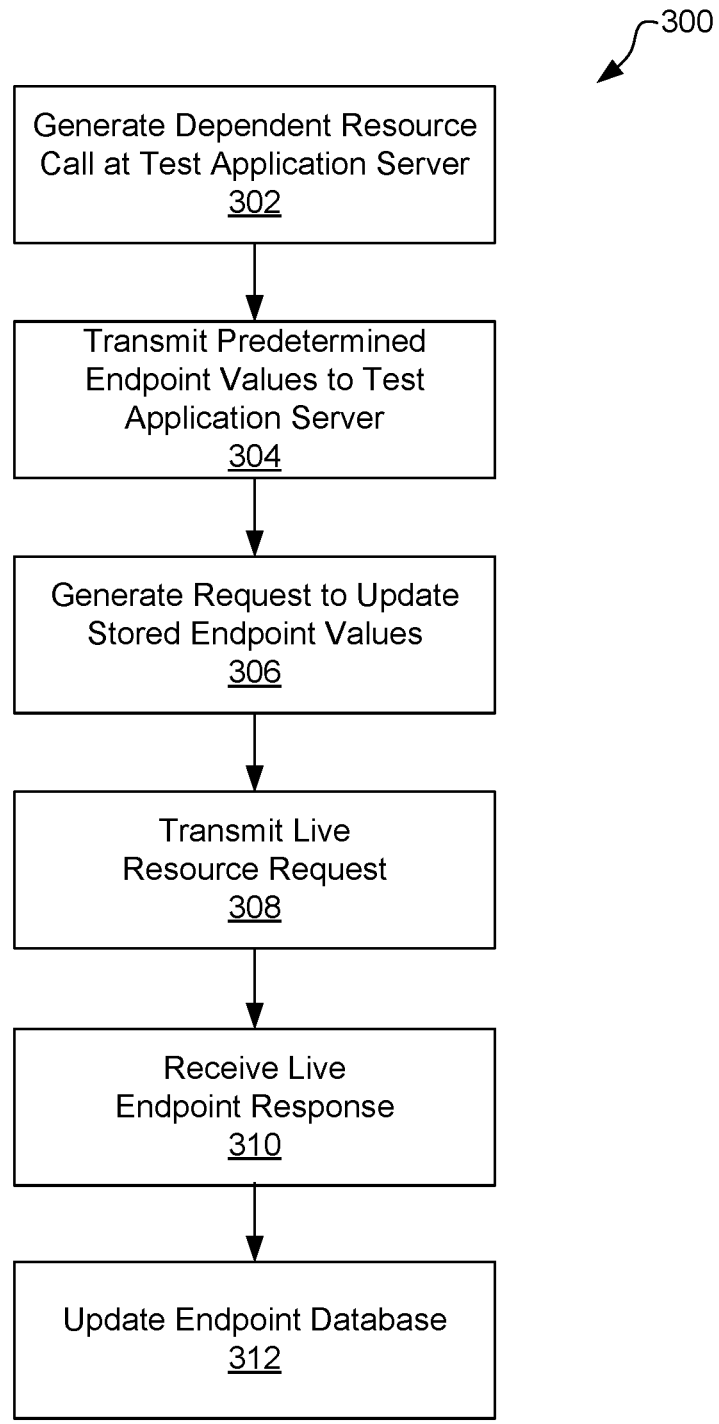
FIG. 6 illustrates a method of updating one or more endpoint values stored in an endpoint database, in accordance with some embodiments.
Figure 7:
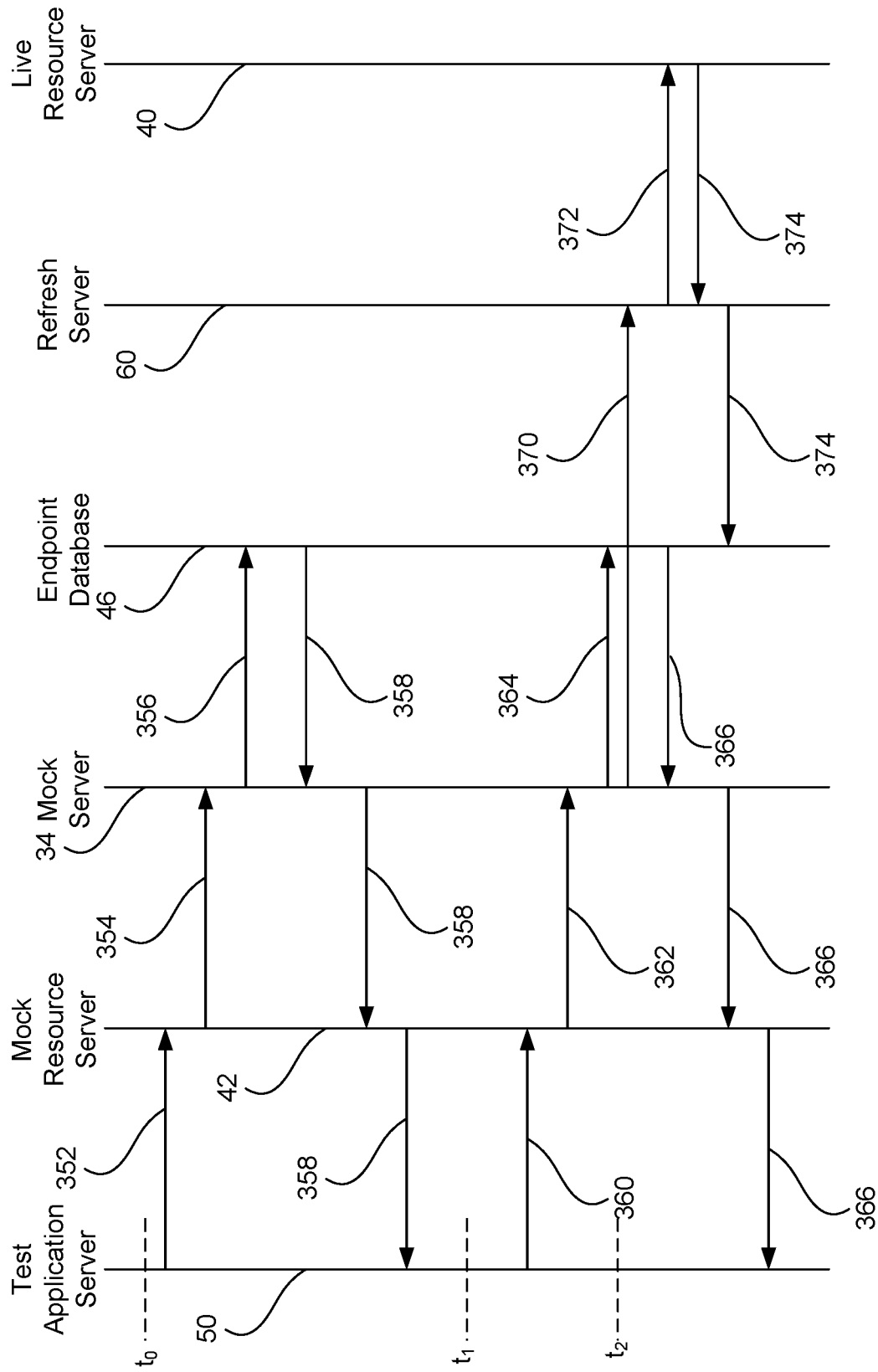
FIG. 7 illustrates a timing diagram for a testing environment including a mock server having an endpoint database configured to be automatically and asynchronously updated by the mock sever, in accordance with some embodiments.

FIG. 6 is a flowchart illustrating a method 300 of updating mock endpoint data and FIG. 7 is a timing diagram 350 illustrating the method 300 of FIG. 6, in accordance with some embodiments. At step 302, a testing server 24 implementing at least one test application server 50 provides a dependent resource call to a mock resource server 42 implemented by a mock server 34 and, at step 304, the mock resource server 42 provides one or more predetermined endpoint responses, as discussed above. In some embodiments, the one or more predetermined endpoint responses are loaded from a database 46 maintained by and/or in signal communication with the mock server 34.

At step 306, the mock server 34 generates a request to update one or more of the stored predetermined endpoint values. The mock server 34 transmits a request to a refresh/record server 60 implemented by one or more servers, such as the gateway server 22. The refresh/record server 60 is configured to provide a call to one or more live resource servers, such as the live resource server 40 illustrated in FIG. 4, to generate one or more live endpoints. The refresh/record server 60 monitors the endpoint response from the live resource server 40 and, at step 308, updates one or more endpoint values stored in the database 46 to reflect the recorded live endpoint values.

The method returns to step 302 and, when a subsequent dependent resource call is received, the mock resource server 42 accesses the database 46 and provides the updated endpoint value as an endpoint response to the test application server 50. The database 46 may be updated asynchronously by the mock server 34 at a predetermined interval and/or in response to one or more inputs, such as a request to implement a mock resource server 42.

For example, FIG. 7 illustrates a timing diagram 350 for a testing environment including a mock server 34 having an endpoint database 46 configured to be automatically and asynchronously updated by the mock sever 34, in accordance with some embodiments. At time to, a test case including one or more parameters is received at a testing server 24. The testing server 24 implements a test application server 50 that generates and transmits a dependent resource call 352 to a mock resource server 42. The mock resource server 42 generates a request 354 to the mock server 34 to load one or more predetermined endpoint responses from a database maintained by the mock server 34. The mock server 34 generates a get request 356 for the database 46 and receives a data record containing the endpoint responses 358. The mock server 34 passes the endpoint responses 358 to the mock resource server 42, which further provides the endpoint responses 358 to the test application server 50.

At a later time $t_1$, a second dependent resource call 360 is received at the mock resource server 42. The second dependent resource call 360 may be generated by the same test application server 50 and/or a different test application server implemented by the testing server 24. The mock resource server 42 receives the second dependent resource call 360 and provides a request 362 to the mock server 34 for one or more predetermined endpoint values associated with the mock resource server 42.

At time $t_2$, the mock server 34 generates an asynchronous request 366 to update (or refresh) the predetermined endpoint values maintained in the endpoint database 46. After generating the asynchronous request 366, the mock server 34 generates a get request 364 for the database 46 and receives a data record containing the endpoint values 366 from the database 46. The endpoint values 366 are provided to the mock resource server 42, which provide the predetermined endpoint values 366 to the test application server 50.

While the mock server 34 is loading and providing the endpoint values 366 from the endpoint database 46, the refresh/record server 60 generates a dependent resource call 370 to a live resource server 40 providing a similar and/or identical resource as the mock resource server 42. The live resource server 40 generates live endpoint values 374 and transmits the live endpoint values 374 to the refresh/record server 60. The refresh/record server 60 records the live endpoint values 374 and updates the endpoint database 46 with the live endpoint values 374. The update to the database 46 occurs after a response to the second dependent resource call 360 has been transmitted and therefore the updated endpoint values will be provided to any subsequent resource requests received by the mock resource server 42 and/or the mock server 34.

Figure 8:
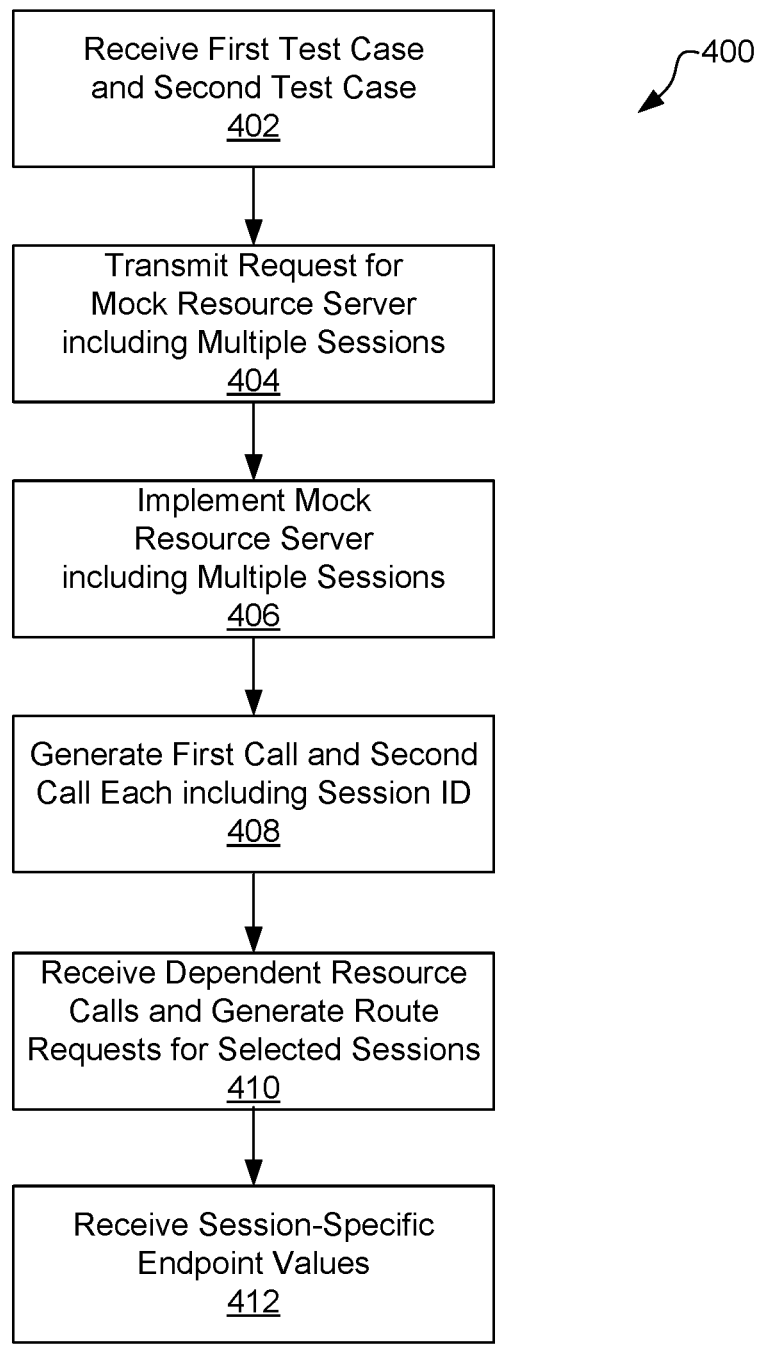
FIG. 8 illustrates a method of providing multiple responses from a single mock server, in accordance with some embodiments.
Figure 9:
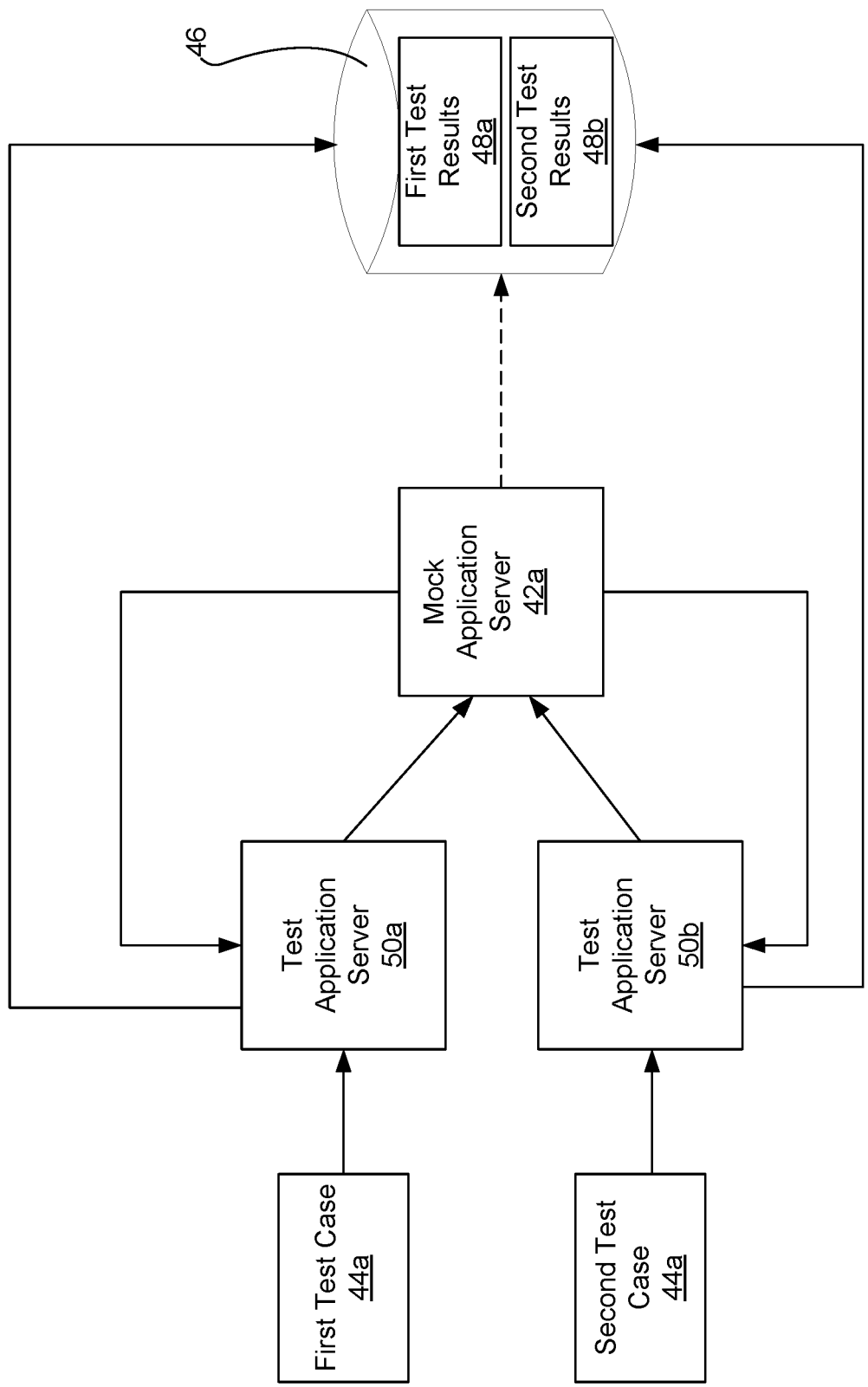
FIG. 9 illustrates various elements of a testing environment during execution of the method of FIG. 8, in accordance with some embodiments.

In some embodiments, a mock resource server 42 may be configured to provide a set of endpoint values selected from a plurality of sets of endpoint values to each test application server 50 implemented by the testing server 24. A method 400 of providing one or more sessions each including a set of endpoint values associated therewith is illustrated in FIG. 8 and FIG. 9 illustrates various elements of a testing environment 20 during execution of the method 400, in accordance with some embodiments. At step 402, a first test case 44a and a second test case 44b are received in parallel by a testing server 24. Although embodiments are illustrated including a single testing server 24, it will be appreciated that the test cases 44a, 44b can be received by multiple testing servers and/or separate instances of a virtual server implemented on the testing server 24.

At step 404, a request for a mock resource server 42 is sent from the testing server 24 to the mock server 34. The request for the mock resource server 42 includes a first set of endpoint responses required for a first test case and a second set of endpoint responses required a second test case. For example, in some embodiments, the first test case 44a includes a an endpoint parameter indicating that a single item should be returned for the "getcart" call and the second test case 44b includes a testing parameter indicating that two items should be returned for the "getcart" call. In order to decrease processing time and increase efficiency, the mock resource server 42a is implemented with multiple sessions each configured to provide a session-specific mock endpoint values.

At step 406, a mock resource server 42a is implemented by the mock server 34. The mock resource server 42a can be implemented according to any of the methods discussed above, and similar description is not repeated herein. The mock resource server 42a includes a plurality of sessions each configured to provide a different set of endpoint values in response to a mock resource call. For example, in some embodiments, the mock resource server 42a is configured to receive a "getcart" call from one or more test application servers 50a, 50b. The mock resource server 42a mocks a cart application and provides a first set of cart values in a first session and a second set of cart values in a second session. The session-specific endpoint values can be assigned based on input parameters of the executed test cases 44a, 44b, potential outputs of a live application server 40 being mimicked, sets of endpoint values stored in a database 46 and/or any other suitable parameters.

For example, in some embodiments, the mock server 34 implements a mock resource server 42a including a first session and a second session. The first session is configured to provide a first set of endpoint values and the second session is configured to provide a second set of endpoint values. In some embodiments, the first session and the second session provide different routes for inputs without needing additional user input. For example, in some embodiments, the mock resource server 42a broadcasts or otherwise identifies available routes implemented in the mock resource server 42a. The test application servers 50a, 50b and/or other devices generate dependent resource calls including a session identifier identifying one of the sessions provided by the mock resource server 42a corresponding to the required output for requesting test application server 50.

At step 408, a first test application server 50a generates a first call including a first session ID, for example getcart (Session_1), and a second test application server 50b generates a second call including a second session ID, for example getcart(Sesssion_2). Although embodiments are discussed herein including a first application server 50a and a second application server 50b, it will be appreciated that multiple dependent resource calls each having different session IDs can be generated by a single application server and/or a greater number of application servers.

At step 410, a session manager implemented by the mock resource server 42a receives each of the first call and the second call and generates a first route request for a first session implemented by the mock resource server in response to the first call and a second route request for a second session in response to the second call. For example, to continue the illustrated embodiment, the session manager receives the first request and identifies a session parameter Session_1 corresponding to the first session (or route) implemented by the mock resource server 42a. The session manager provides a route call for the first session, which generates a first set of endpoint values (such as a cart containing a single item), which is transmitted back to the first test application server 50a.

Simultaneously (or parallel) with the first call, the mock application sever 42a receives the second call and identifies a session parameter Session_2 corresponding to the second session implemented by the mock resource server 42a. The session manager provides a route request for the second session, which generates a second set of endpoint values (such as a cart containing two items), which is transmitted back to the second test application server 50b. At step 412, each of the first test application server 50a and the second test application server 50b receive session-specific endpoint values from the mock resource server 42a and the test application servers 50a, 50b complete execution of each of the test cases 44a, 44b.

Figure 10:
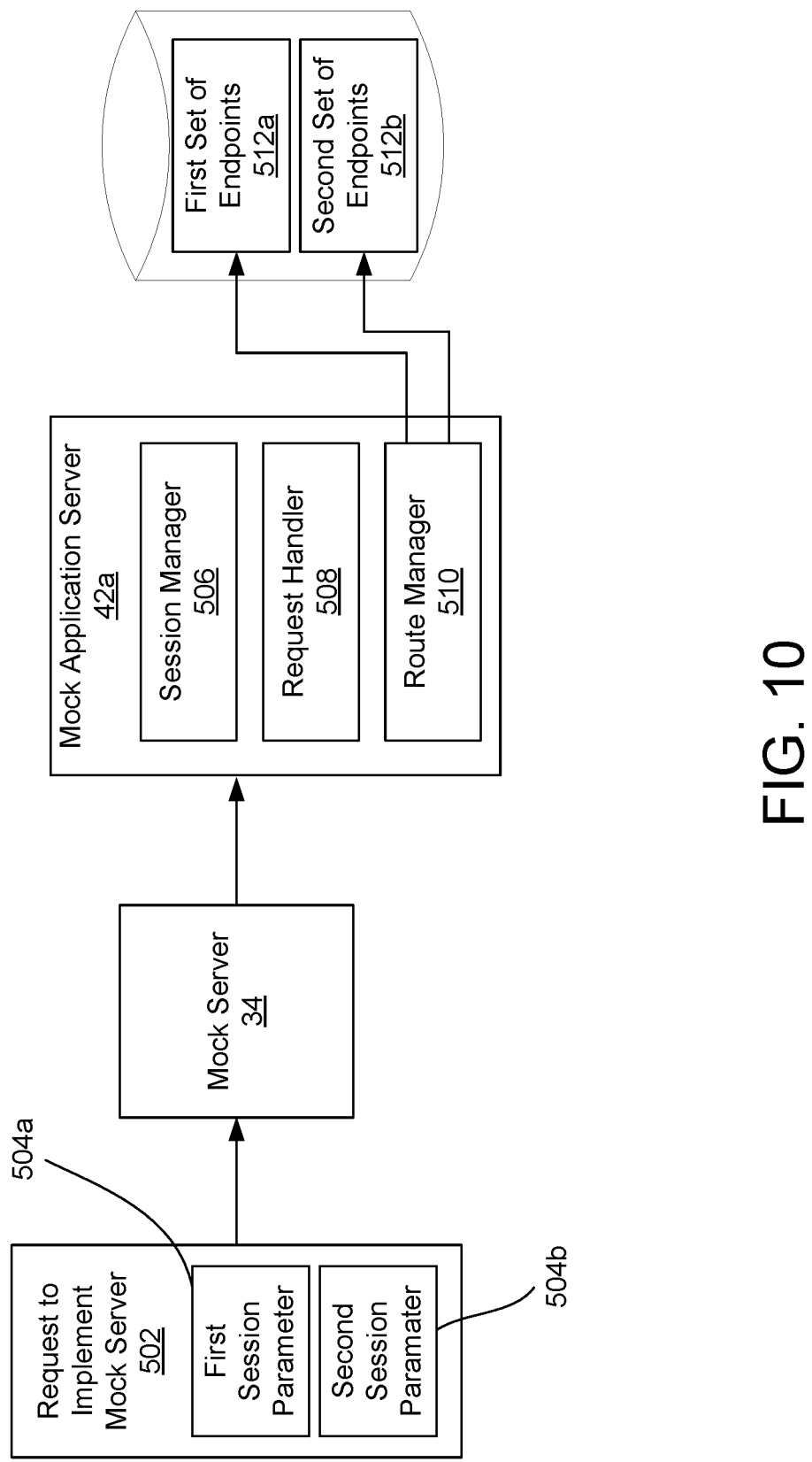
FIG. 10 illustrates an internal process flow of a mock server for generating at least one mock resource server including multiple parallel routes, in accordance with some embodiments.

FIG. 10 illustrates an internal process flow 500 of a mock server 34 for generating at least one mock resource server 42a including multiple parallel sessions, in accordance with some embodiments. The mock server 34 receives a request 502 to implement a mock resource server 42a including parameters 504a, 504b identifying at least two sets of endpoint values for the mock resource server 42a. For example, in some embodiments, the request 502 includes a first parameter 504a corresponding to a first set of endpoint values 512a and a second parameter 504b corresponding to a second set of endpoint values 512b.

The request 502 is processed by the mock server 34 which starts a mock resource server 42a with two sessions. The mock resource server 42a includes a session manager 506 configured to maintain each session (or route), remove and/or add sessions based on additional requirements of the testing server 24, and/or assign session IDs for each session. The mock resource server 42a further includes a request handler 508 configured to receive dependent resource calls from the test application servers 50a, 50b. The request handler 508 converts each dependent resource call to a route request corresponding to one of the available sessions. The route request is passed to a route manager 510, which passes the request to the identified session. The selected session generates a session-specific set of endpoint values. The session-specific set of endpoint values 512a, 512b is a specific set of endpoint values 512a, 512b associated with the session and provided for each test application server 50 that generates a mock resource call including a corresponding session ID.

Figure 11:
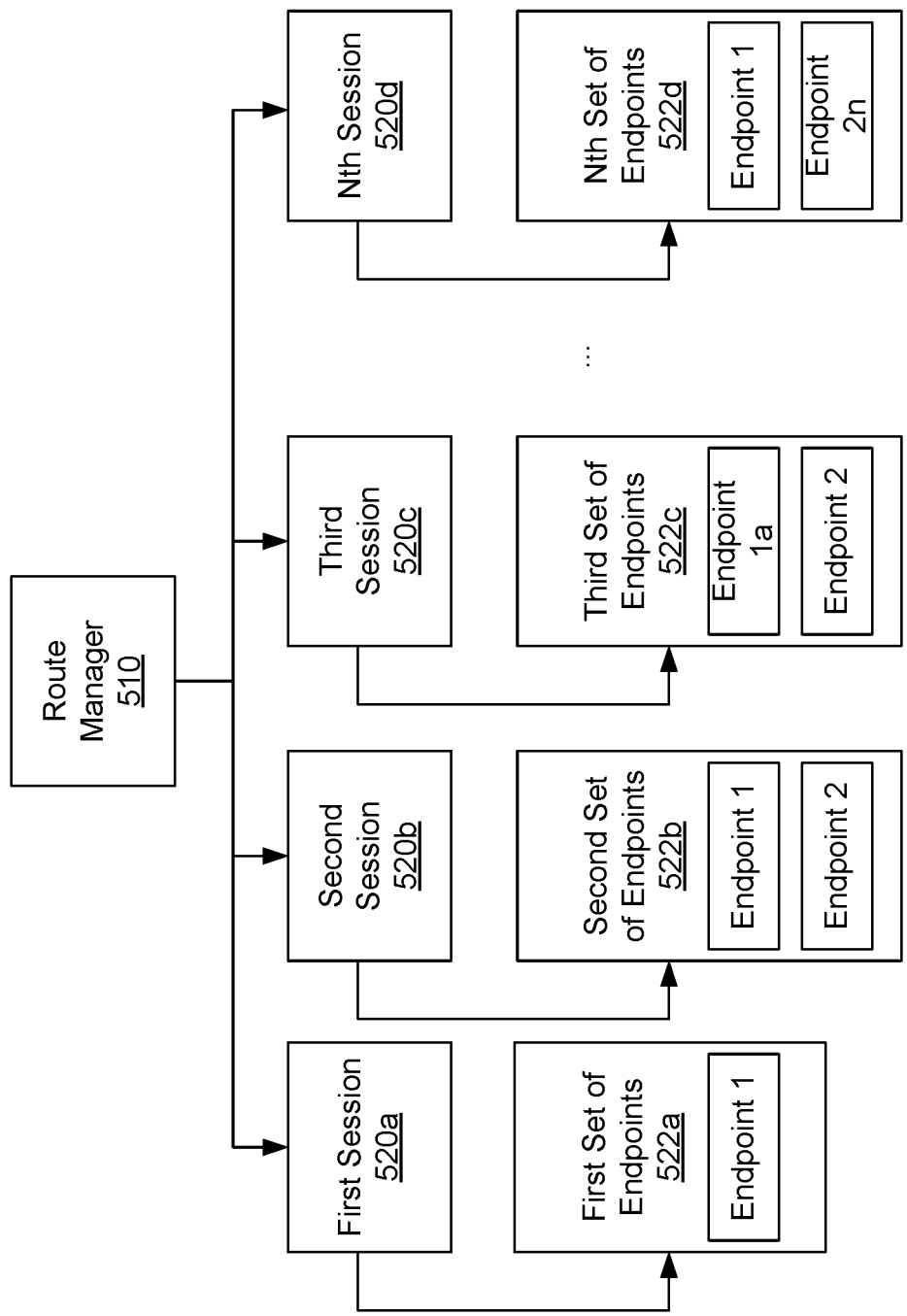
FIG. 11 illustrates a plurality of routes implemented by a mock resource server, in accordance with some embodiments.

FIG. 11 illustrates a plurality of sessions 520a-520d implemented by a mock resource server 42a, in accordance with some embodiments. For example, in the illustrated embodiment, the plurality of sessions 520a-520d include n sessions, where n is any positive integer. Each session 520a-520d includes a set of endpoint values 522a-522d associated with the session 520a-520d. When the route manager 510 selects a session 520a-520d (i.e., based on a session identifier included in a dependent resource call), the endpoint values 522a-522d associated with the selected session 520a-520d are provided to the requesting test application server 50.

In some embodiments, additional sessions 520a-520d can be added by the route manager 510 and/or the mock resource server 42a based on additional parameters and/or session identifiers provided by the testing server 24. For example, in some embodiments, the testing server 24 may receive an additional test case including a testing parameter indicating endpoint values not included in the currently implemented sessions. The mock server 34 may implement an additional session in the mock resource server 42a based on the requirements of the additional test case received by the testing server 24.

Figure 12:
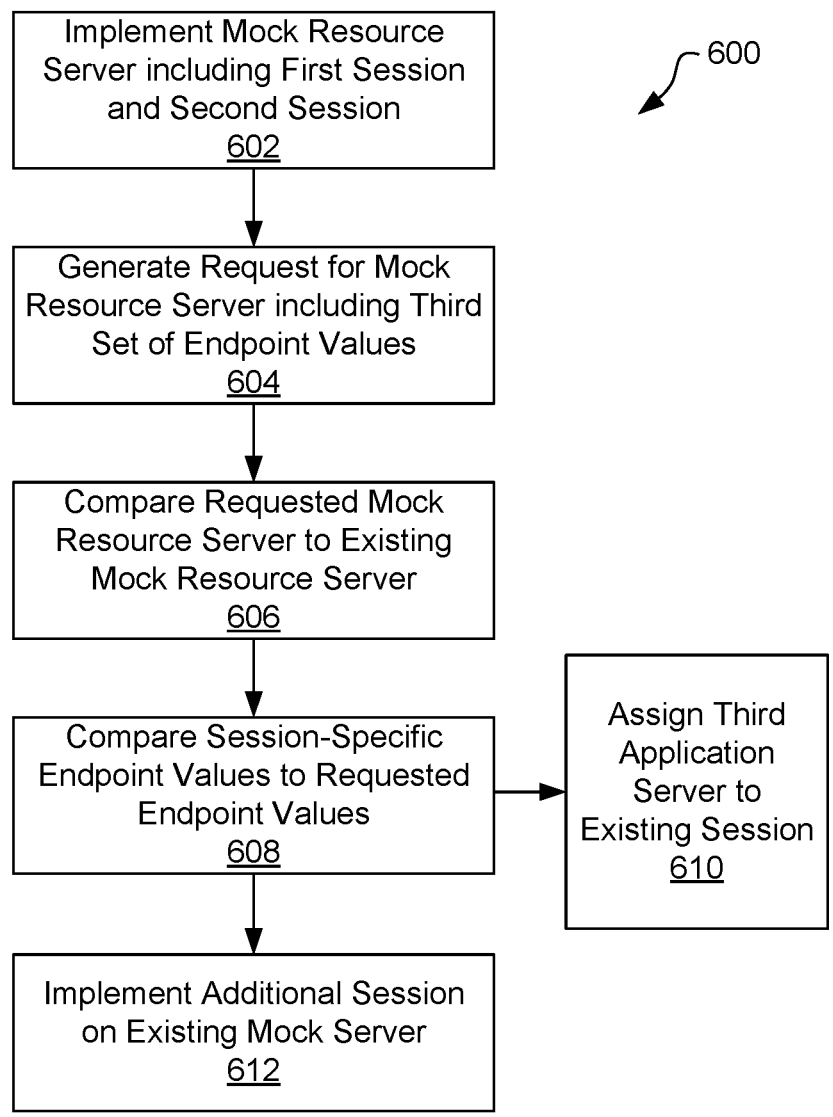
FIG. 12 illustrates a method of adding one or more sessions to an existing mock resource server, in accordance with some embodiments.

FIG. 12 illustrates a method 600 of adding one or more sessions to an existing mock resource server 42a, in accordance with some embodiments. At step 602, the mock server 34 executes a mock resource server 42a including a first session and a second session. Each of the sessions includes a session ID and is configured to provide a predetermined set of session-specific endpoint values. For example, in some embodiments, the session-specific endpoint values can include test case specific endpoints, user specific endpoints, tenant specific endpoints, etc. In some embodiments, the first session and the second session are implemented based on parameters provided by at least a first test case and a second test case received by a testing server 24, as discussed in greater detail above.

At step 604, the testing server 24 receives a third test case including testing parameters indicating a third set of endpoint values is required. The testing server 24 generates a request to the mock server 34 to implement a mock resource server having a session associated with the third set of endpoint values.

At step 606, the mock server 34 receives the request from the testing server 24 and determines that requested mock resource server is already implemented as an existing mock resource server 42a. At step 608, the mock server 34 compares the requested session and endpoint to the existing sessions and associated endpoints to determine if an existing session generates the requested endpoint values. If an existing session is identical to the requested session, the method 600 proceeds to step 610 and assigns the third test case to the selected existing session.

However, if an existing session is not identical to the requested session and/or session-specific endpoint values, the method 600 proceeds to step 612 to implement an additional session on the mock resource server 42a. The mock server 34 generates a request to the mock resource server 42a to implement an additional session configured to generate the third set of endpoint values as session-specific endpoint values. The additional session is assigned a session ID which is provided to the testing server 24 at step 612 for use in resource calls during execution of the third test application server. The mock resource server 42a adds the additional session ID to the route manager, which is configured to pass resource calls including the additional session ID to the added session.

Figure 13:
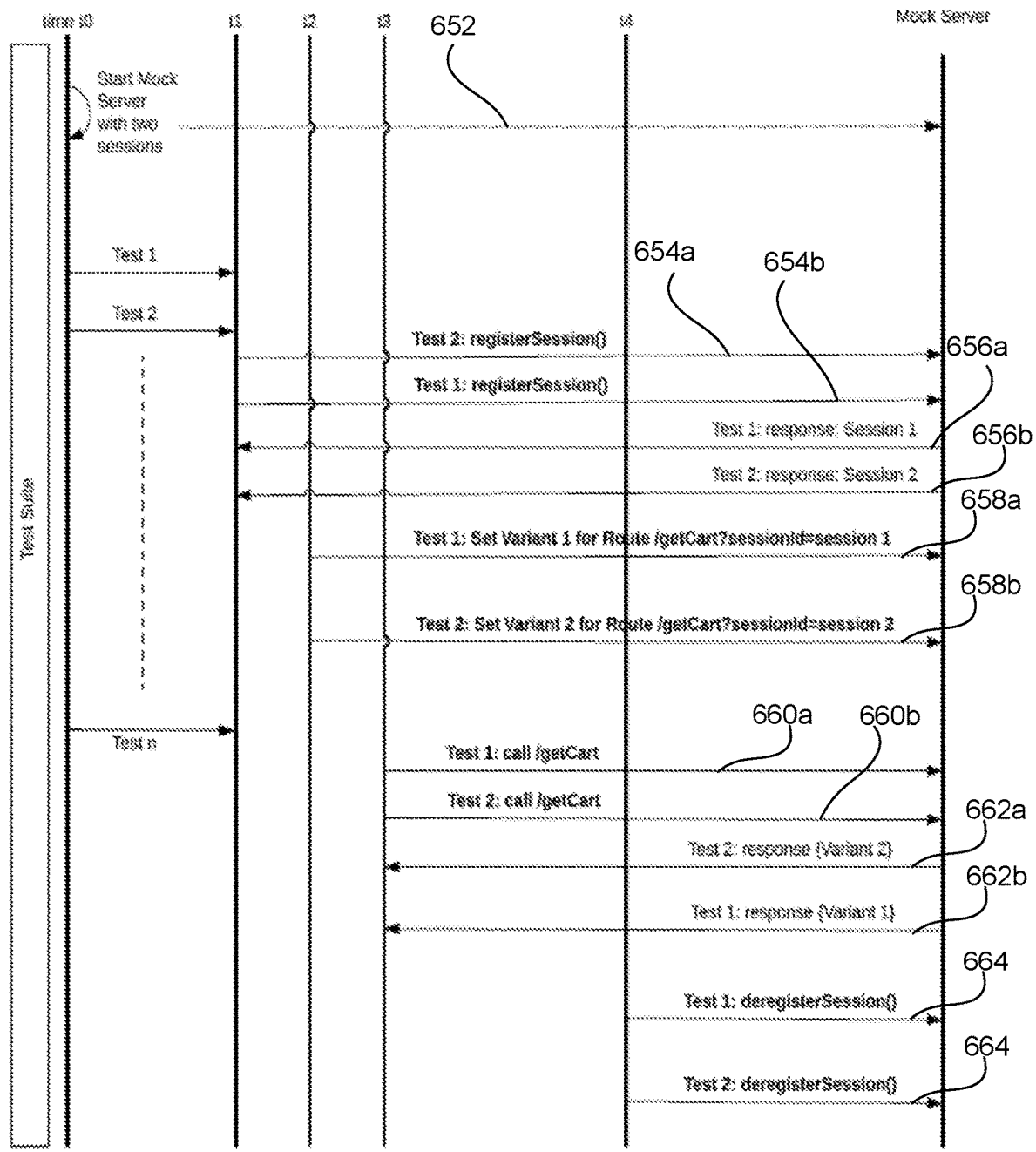
FIG. 13 illustrates a timing diagram for a mock server 4 including a mock resource server implementing a first session and a second session, in accordance with some embodiments.

FIG. 13 illustrates a timing diagram 650 for a mock server 34 including a mock resource server 42a implementing a first session and a second session. At time $t_0$, a test server 24 generates a request 652 to a mock server 34 to implement a mock resource server 42a including a first session and a second session, as discussed above. The mock server 34 receives the request 652 and implements the mock resource server 42a. At time $t_1$, a first test application server 50a and a second test application server register 654a, 654b with the mock server 34 to use the mock application server 42a during a test run. The mock server 34 provides a response 656a, 656b to each of the test application servers 50a, 50b indicating the sessions IDs associated with each session associated with each of the test applications servers 50a, 50b.

At time $t_2$, parameter identifiers 658a, 658b identifying the set of endpoint responses to be used for each implemented session are provided to the mock server 34. The mock server 34 assigns each of the identified sets of endpoint responses to the sessions associated with the requesting test application server 50a, 50b.

At time $t_3$, the mock server 34 receives dependent resource calls 660a, 660 from each of test application servers 50a, 50b. In some embodiments, the dependent resource calls 660a, 660b include a session ID associated with the session assigned to each of the test application servers 50a, 50b. The mock server 34 passes each of the dependent resource calls 660a, 660b to the mock resource server 42a, which generates sessions-specific endpoint responses 662a, 662b for each of the test application servers 50a, 50b.

At time $t_4$, the test application servers 50a, 50b complete operation and are deregistered 664 from the sessions implemented by the mock resource server 42a. Additional and/or alternative test application servers may be registered with each session after deregistering the prior test application server.

In some embodiments, implementation of parallel sessions in a single mock resource server reduces hardware and virtual machine costs. For example, in some embodiments, implementation of a mock resource server having multiple parallel routes requires a single virtual machine. In contrast, implementations that include a mock resource server for each test case require a virtual machine be associated with each implemented mock application. Implementation of a single mock resource server can provide a reduction in required resources equal to the number of parallel paths implemented by the mock resource server. For example, in various embodiments, a reduction of hardware and virtual machine resources of up to 90% can be realized when implementing a mock resource server having parallel sessions.

In some embodiments, implementation of parallel sessions in a single mock resource server increases response time and reduces run time for test cases. For example, in some embodiments, parallel execution of multiple sessions allows a single mock resource server to support multiple parallel test cases simultaneously. For example, in various embodiments, parallel sessions allow multiple test cases to be implemented by a testing server 24 simultaneously, which can reduce execution of test cases by at least 50% in some embodiments, although it will be appreciated that the number of parallel sessions and parallel test cases implemented by the testing environment 20 can increase and/or decrease the total time savings in various embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A system, comprising:
   a memory having instructions stored thereon, and a processor configured to read the instructions to:
   receive a plurality of test cases, each test case including at least one test parameter;

select a mock test for at least a first test case of the plurality of cases based on the test parameter for the first test case;
select a live test for at least a second test case of the plurality of cases based on the test parameter for the second test case;
when the mock test is selected, the processor is further configured to read instructions to:
execute a mock resource server including at least a first session associated with a first set of endpoint values, wherein the mock resource server is configured to receive a session request and provide a first set of endpoint values, and wherein the first session is associated with a first session identifier;
receive a first resource call including the first session identifier, wherein the resource call is generated by a first application server during execution of the first test case;
generate a session request for the first session; and
transmit the first set of endpoint values to the first application server, wherein the first set of endpoint values is provided by the first session in response to the session request; and
when the live test is selected, the processor is further configured to read instructions to:
transmit the at least one test parameter to a live resource server; and
receive a set of live endpoint values generated by the live resource server.

2. The system of claim 1, wherein the mock resource server includes a second session associated with a second set of endpoint values, wherein a second session identifier is associated with the second session, and wherein the processor is configured to read the instructions to:
receive a second resource call including a second session identifier, wherein the second resource call is generated by a second application server during execution of a third test case;
generate a session request for the second session; and
transmit the second set of endpoint values to the second application server, wherein the second set of endpoint values is provided by the second session in response to the session request.

3. The system of claim 2, wherein the first application server executes the first test case in parallel with the second application server executing the third test case, and wherein the first resource call and the second resource call are received by the mock resource severer substantially in parallel.

4. The system of claim 1, wherein prior to executing the mock resource server, the processor is configured to read the instructions to:
receive a request to implement a mock resource server from a testing server, wherein the request includes one or more sets of endpoint values including the first set of endpoint values; and
wherein the mock resource server includes one or more sessions each associated one of the sets of endpoint values included in the request.

5. The system of claim 4, wherein the processor is configured to read the instructions to:
receive a second resource call including a second session identifier, wherein the second session identifier is not associated with any of the one or more sessions;
implement a second session in the mock resource server, wherein the second session is associated with a second set of endpoint values;
generate a session request for the second session; and
transmit the second set of endpoint values, wherein the second set of endpoint values is provided by the second session in response to the session request.

6. The system of claim 5, wherein the processor is configured to read the instructions to request the second set of endpoint values from the testing server.

7. The system of claim 1, wherein the processor is configured to read the instructions to:
transmit a live resource call to a live application server, wherein the live resource call includes the at least one test parameter associated with the first test case;
receive a live endpoint response from the live application server;
update the first set of endpoint values associated with the first session based on the live endpoint responses.

8. A non-transitory computer readable medium having instructions stored thereon, wherein the instructions, when executed by a processor cause a device to perform operations comprising:
receiving a plurality of cases, each test case including at least one test parameter;
selecting a mock test for at least a first test case of the plurality of cases based on the test parameter for the first test case;
selecting a live test for at least a second test case of the plurality of cases based on the test parameter for the second test case;
when the mock test is selected, the processor causes the device to perform operations comprising:
executing a mock resource server including at least a first session associated with a first set of endpoint values, wherein the mock resource server is configured to receive a session request and provide a set of endpoint values, and wherein the first session is associated with a first session identifier;
receiving a first resource call including the first session identifier, wherein the resource call is generated by a first application server during execution of the first test case;
generating a session request for the first session; and
transmitting the first set of endpoint values to the first application server, wherein the first set of endpoint values is provided by the first session in response to the session request; and
when the live test is selected, the processor causes the device to perform operations comprising:
transmitting the at least one test parameter to a live resource server; and
receiving a set of live endpoint values generated by the live resource server.

9. The non-transitory computer readable medium of claim 8, wherein the mock resource server includes a second session associated with a second set of endpoint values, wherein a second session identifier is associated with the second session, and wherein the instructions, when executed by the processor cause the device to perform further operations comprising:
receiving a second resource call including a second session identifier, wherein the second resource call is generated by a second application server during execution of a third test case;
generating a session request for the second session; and
transmitting the second set of endpoint values to the second application server, wherein the second set of endpoint values is provided by the second session in response to the session request.

10. The non-transitory computer readable medium of claim 9, wherein the first application server executes the first test case in parallel with the second application server executing the third test case, and wherein the first resource call and the second resource call are received by the mock resource severer substantially in parallel.

11. The non-transitory computer readable medium of claim 8, wherein the instructions, when executed by the processor cause the device to perform further operations prior to executing the mock resource server, the further operations comprising:
receiving a request to implement a mock resource server from a testing server, wherein the request includes one or more sets of endpoint values including the first set of endpoint values; and
wherein the mock resource server includes one or more sessions each associated one of the sets of endpoint values included in the request.

12. The non-transitory computer readable medium of claim 11, wherein the instructions, when executed by the processor cause the device to perform further operations comprising:
receiving a second resource call including a second session identifier, wherein the second session identifier is not associated with any of the one or more sessions;
implementing a second session in the mock resource server, wherein the second session is associated with a second set of endpoint values;
generating a session request for the second session; and
transmitting the second set of endpoint values, wherein the second set of endpoint values is provided by the second session in response to the session request.

13. The non-transitory computer readable medium of claim 12, wherein the instructions, when executed by the processor cause the device to perform further operations comprising requesting the second set of endpoint values from the testing server.

14. The non-transitory computer readable medium of claim 8, wherein the instructions, when executed by the processor cause the device to perform further operations comprising:
transmitting a live resource call to a live application server, wherein the live resource call includes the at least one test parameter associated with the first test case;
receiving a live endpoint response from the live application server;
updating the first set of endpoint values associated with the first session based on the live endpoint responses.

15. A method, comprising:
receiving a plurality of cases, each test case including at least one test parameter;
selecting a mock test for at least a first test case of the plurality of cases based on the test parameter for the first test case;
selecting a live test for at least a second test case of the plurality of cases based on the test parameter for the second test case;
when the mock test is selected:
executing a mock resource server including at least a first session associated with a first set of endpoint values, wherein the mock resource server is configured to receive a session request and provide a set of endpoint values, and wherein the first session is associated with a first session identifier;
receiving a first resource call including the first session identifier, wherein the resource call is generated by a first application server during execution of a first test case;
generating a session request for the first session; and
transmitting the first set of endpoint values to the first application server, wherein the first set of endpoint values is provided by the first session in response to the session request; and
when the live test is selected, the processor causes the device to perform operations comprising:
transmitting the at least one test parameter to a live resource server; and
receiving a set of live endpoint values generated by the live resource server.

16. The method of claim 15, wherein the mock resource server includes a second session associated with a second set of endpoint values, wherein a second session identifier is associated with the second session, and wherein the method further comprises:
receiving a second resource call including a second session identifier, wherein the second resource call is generated by a second application server during execution of a third test case;
generating a session request for the second session; and
transmitting the second set of endpoint values to the second application server, wherein the second set of endpoint values is provided by the second session in response to the session request.

17. The method of claim 16, wherein the first application server executes the first test case in parallel with the second application server executing the third test case, and wherein the first resource call and the second resource call are received by the mock resource severer substantially in parallel.

18. The method of claim 15, comprising:
receiving a second resource call including a second session identifier, wherein the second session identifier is not associated with any of the one or more sessions;
implementing a second session in the mock resource server, wherein the second session is associated with a second set of endpoint values;
generating a session request for the second session; and
transmitting the second set of endpoint values, wherein the second set of endpoint values is provided by the second session in response to the session request.

* * * * *